United States Patent

[11] 3,539,084

| [72] | Inventor | John A. Bradshaw |
| | | Somerville, Massachusetts |
| [21] | Appl. No. | 778,655 |
| [22] | Filed | Nov. 25, 1968 |
| [45] | Patented | Nov. 10, 1970 |
| [73] | Assignee | By mesne assignments, to Synergistics, Inc., East Watick, Massachusetts a corporation of Massachusetts |

[54] SENSING DEVICE
3 Claims, 3 Drawing Figs.

[52] U.S. Cl.................................................... 226/11, 226/91
[51] Int. Cl..................................................... B65h 25/04
[50] Field of Search......................................... 226/11; 200/61.18; 242/57; 352/157; 226/91

[56] References Cited
UNITED STATES PATENTS
2,954,940  10/1960  Herrmann..................... 252/57X

*Primary Examiner*—Allen N. Knowles
*Attorney*—Lee A. Strimbeck

ABSTRACT: A sensing device employing an idler wheel over which a recording medium rides. The recording portion of the recording medium is narrower than the leader portion and rides at a first level in a circumferential channel along the periphery of the idler wheel. The wider leader portion of the recording medium rides at a second level concentric with the first level. A switch is positioned so as to be actuated by the leader portion passing through the idler wheel at the second level.

Patented Nov. 10, 1970 3,539,084

INVENTOR.
JOHN A. BRADSHAW
BY David M. Keay
AGENT

SENSING DEVICE

BACKGROUND OF THE INVENTION

The invention relates to sensing devices and, in particular, to devices for sensing strips of a recording medium such as film or magnetic tape.

In a light impervious film transport system useful, for example, in a laser recorder, it is desirable to automatically sense the ends of the film without exposing the film to ambient light. One technique for sensing the ends of the film involves the use of a photoconductor positioned behind the film at the recording head. When a leader of an opaque material passes by the recording head, the light to the photoconductor is interrupted thus indicating the end of the recording portion of the film. This technique has the disadvantage of additional power consumption and circuit complexity.

BRIEF SUMMARY OF THE INVENTION

Apparatus according to the present invention senses the leader portion or the recording portion of a recording medium, for example, photographic film, in which the leader portion is wider than the recording portion. The apparatus includes a driving source to transfer the film from a supply reel to a takeup reel. Positioned along the path of the film is a guiding device, for example, an idler wheel, to guide the recording portion of the film at a first level and the leader portion at a second level. A sensing device, such as a switch, is employed to detect the presence of the leader portion at the second level.

BRIEF DESCRIPTION OF THE DRAWINGS

The construction and operation of the sensing device according to the present invention will be more fully understood from the following detailed description taken in conjunction with the accompanying drawings in which.

DETAILED DESCRIPTION OF THE INVENTION

Figure 2:
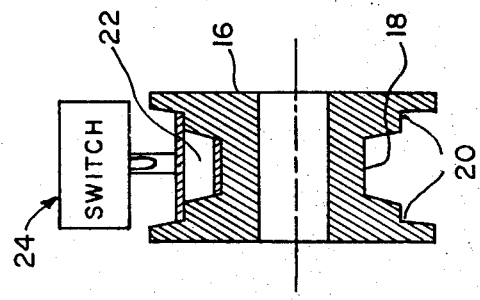
FIGS. 1 and 2 are side and cross-sectional views, respectively, of a preferred embodiment of the invention.
Figure 3:
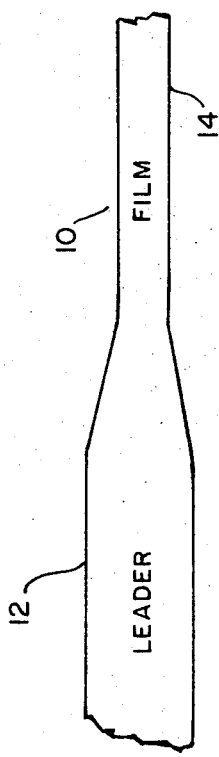
FIG. 3 is a top view of a recording medium employed in the embodiment of FIGS. 1 and 2.
Figure 1:
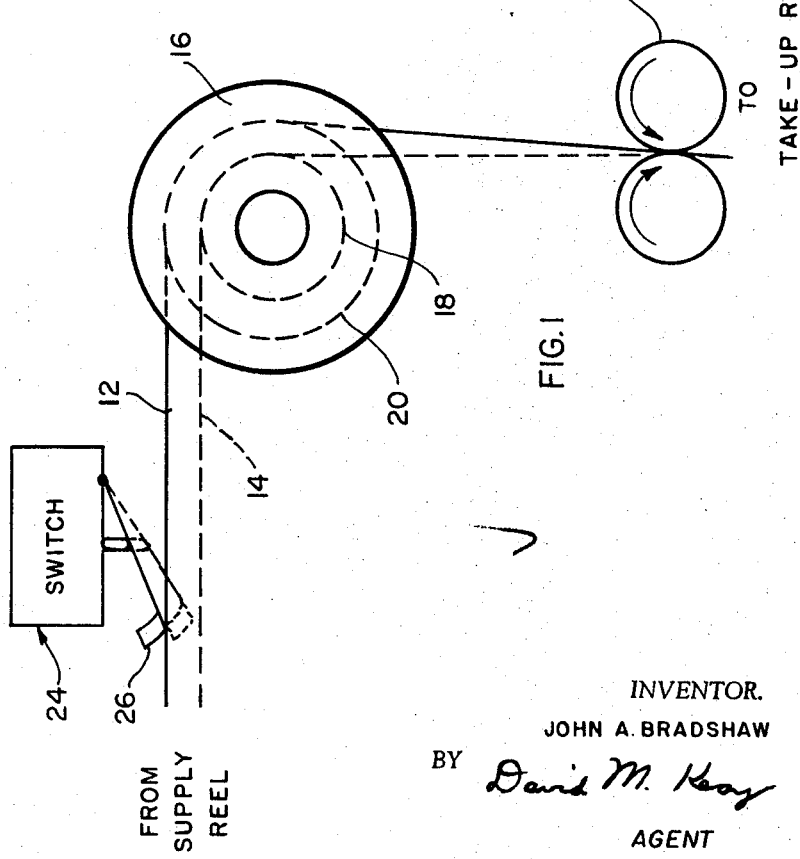

Referring to FIGS. 1 and 2, apparatus according to the present invention for sensing the leader or recording portion of a recording medium is shown. The recording medium, for example, photographic film 10, as shown in FIG. 3, has its leader portion 12 wider than its recording portion 14. The apparatus includes a guiding device, such as an idler wheel 16, placed along the path of the film 10 between a supply reel (not shown) and a takeup reel (not shown). The film is driven between the two reels by a suitable drive mechanism such as the drive wheels 17. The idler wheel 16 has two concentric surfaces 18 and 20 of different radii which form a circumferential channel 22 extending inwardly and running along the periphery of the wheel 16. The width of the channel 22 between the two concentric surfaces 18 and 20 is of a predetermined dimension to accommodate only the recording portion 14 of the film 10 and not the wider leader portion 12. Positioned adjacent to the idler wheel 16 is a sensing device, such as a switch 24, which includes a pivotally mounted arm 26 located along the path of movement of the film 10.

In operation, the film 10 is driven by the drive mechanism 17 across the idler wheel 16 to the storage reel. The recording portion 14 rides on the surface 18 of the idler wheel 16. When the leader portion 12 arrives at the idler wheel 16, the film 10 is transferred from surface 18 to surface 20. In traversing the radial space between surfaces 18 and 20, the film 10, adjacent to the idler wheel, moves from a first level as indicated by the position of the film 10 riding on the surface 18 to a second level as indicated by the position of the leader portion 12 riding on the surface 20. In moving from the first level to the second level, the film 10 actuates the switch 24 by depressing the pivotally mounted arm 26 indicating the end of recording portion 14 or the presence of the leader portion 12 of the film 18.

While a preferred embodiment of a film sensing device has been shown and described, variations such as employing the outer edge of the idler wheel as the second surface may be made without departing from the spirit of the invention.

I claim:

1. A sensing device for distinguishing the leader portion of a recording medium from the recording portion, the leader portion having a width greater than that of the recording portion, said sensing device comprising:
    driving means for moving the recording medium along a path;
    means located along said path for guiding the recording portion of said recording medium at a first level and the leader portion of said recording medium at a second level; and
    means located along said path adjacent to said means for guiding for sensing the level of said recording medium.

2. A sensing device according to claim 1 wherein said means for guiding includes: an idler wheel having first and second circumferential concentric surfaces of different radii, said first and second surfaces forming a peripheral channel extending inward towards the center of said idler wheel, said channel having a predetermined width to accommodate only the recording portion of said recording medium.

3. A sensing device according to claim 2 wherein said means for sensing includes a switch positioned along said path adjacent to said guiding means and having an arm extending between said first and second levels, said arm being adapted to move to said second level in response to the presence of said leader portion passing through said idler wheel at said second level to thereby actuate said switch.